United States Patent
Chen et al.

(10) Patent No.: US 7,895,185 B2
(45) Date of Patent: Feb. 22, 2011

(54) ROW-IDENTIFIER LIST PROCESSING MANAGEMENT

(75) Inventors: Ying-Lin Chen, San Jose, CA (US); You-Chin Fuh, San Jose, CA (US); Fen-Ling Lin, San Jose, CA (US); Terence Patrick Purcell, Springfield, IL (US); Ying Zeng, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 11/536,400

(22) Filed: Sep. 28, 2006

(65) Prior Publication Data

US 2008/0082489 A1      Apr. 3, 2008

(51) Int. Cl.
*G06F 17/30* (2006.01)

(52) U.S. Cl. .................................. 707/711; 707/742
(58) Field of Classification Search .............. 707/711, 707/742
See application file for complete search history.

(56) References Cited

U.S. PATENT DOCUMENTS

| | | | | |
|---|---|---|---|---|
| 5,778,353 A | * | 7/1998 | Schiefer et al. ............... | 707/2 |
| 5,781,903 A | * | 7/1998 | Rusterholz ................. | 707/742 |
| 5,915,249 A | * | 6/1999 | Spencer ..................... | 707/742 |
| 5,978,792 A | | 11/1999 | Bhargava et al. | |
| 5,983,218 A | * | 11/1999 | Syeda-Mahmood ......... | 707/769 |
| 6,094,649 A | * | 7/2000 | Bowen et al. ............... | 707/711 |
| 6,336,117 B1 | * | 1/2002 | Massarani ................... | 707/711 |
| 6,338,056 B1 | * | 1/2002 | Dessloch et al. ............. | 707/2 |
| 6,457,053 B1 | | 9/2002 | Satagopan et al. | |
| 6,549,895 B1 | * | 4/2003 | Lai .............................. | 707/2 |
| 6,631,366 B1 | | 10/2003 | Nagavamsi et al. | |
| 6,633,885 B1 | | 10/2003 | Agrawal et al. | |
| 6,741,985 B2 | * | 5/2004 | Green ........................ | 707/742 |
| 6,847,966 B1 | * | 1/2005 | Sommer et al. ............ | 707/739 |
| 6,848,102 B2 | | 1/2005 | Nakahara et al. | |
| 6,859,808 B1 | | 2/2005 | Chong et al. | |
| 6,877,001 B2 | * | 4/2005 | Wolf et al. ................. | 707/711 |
| 7,082,427 B1 | * | 7/2006 | Seibel et al. ............... | 707/661 |
| 2001/0037322 A1 | | 11/2001 | Lindsay et al. | |
| 2003/0195869 A1 | | 10/2003 | Bhattacharjee et al. | |
| 2005/0114365 A1 | | 5/2005 | Tucker | |

OTHER PUBLICATIONS

Chong et al., *B+-Tree Indexes with Hybrid Row Identifier in Oracle8i*, 2001, pp. 341-348, Oracle Corporation, New Hampshire USA.

* cited by examiner

*Primary Examiner*—Don Wong
*Assistant Examiner*—Kim T Nguyen
(74) *Attorney, Agent, or Firm*—Kali Law Group, P.C.

(57) ABSTRACT

A method, computer program product, and system for managing row identifier (RID) list processing on an index are provided. The method, computer program product, and system provide for accessing one or more key values in the index based on one or more keys specified in a query, retrieving a plurality of row identifiers corresponding to the one or more key values from the index, and predicting an actual number of row identifiers to be retrieved from the index based on the one or more key values accessed and the plurality of row identifiers retrieved.

20 Claims, 8 Drawing Sheets

ROW-IDENTIFIER LIST PROCESSING MANAGEMENT

FIELD OF THE INVENTION

The present invention relates generally to database systems. More particularly, the present invention is directed to management of row identifier list processing in database systems.

BACKGROUND OF THE INVENTION

Row identifier (RID) list processing, also referred to as record identifier list processing, is a technique generally used for execution of a query to avoid excessive get-page calls and random inputs/outputs (I/Os) caused by scanning of a table with a poorly clustered index. There are usually three steps involved in RID list processing. During the first step, a list of row identifiers satisfying a query is compiled by scanning one or more indexes. Next, the list of row identifiers is sorted in order of page number. Finally, the needed data pages are prefetched in page sequence of the sorted RID list.

The row identifiers for qualifying rows/records from the one or more indexes are typically sorted in a RID pool so that data pages can be processed in sequence. Only data pages with qualifying rows will be read. Multiple qualifying rows found in one data page will only require a single I/O to the page, which may reduce the overall number of I/Os compared to direct index access without RID list processing. Data pages may then be prefetched asynchronously in sequence as they appear on a direct access storage device (DASD) to reduce seek time and reduce I/O wait time.

Selection of RID list processing over performance of a tablespace scan is sometimes based on insufficient or inaccurate statistics at bind time (i.e., when an access path/plan is chosen for a query). In addition, because execution time may occur hours, days, or even months after bind time, the statistics used to bind the query may be stale by the time the query is executed. As a result, some database management systems (DBMS) include mechanisms to terminate RID list processing under specific circumstances.

One such mechanism terminates RID list processing when the number of row identifiers retrieved during execution exceeds a threshold percentage of the total number of row identifiers in a table. Under another mechanism, when the amount of memory allocated to a RID list process is fully utilized prior to completion of the RID list process, the RID list process is terminated.

With the above mechanisms, RID list processing yields poor performance because the RID list processing is terminated, the row identifiers collected are discarded, and the entire execution process is restarted with an alternative plan, such as a tablespace scan. In addition, if only a few more row identifiers needed to be retrieved to complete the RID list processing, it would be more efficient to continue with the RID list processing than to terminate it and start over with another access plan. Further, terminating a RID list process can affect other concurrent processes that may be sharing memory space with the terminated RID list process.

Accordingly, there is a need for a technique that better manages RID list processing to more efficiently use shared memory and avoid waste.

SUMMARY OF THE INVENTION

A method, computer program product, and system for managing row identifier (RID) list processing on an index are provided. The method, computer program product, and system provide for accessing one or more key values in the index based on one or more keys specified in a query, retrieving a plurality of row identifiers corresponding to the one or more key values from the index, wherein the plurality of row identifiers retrieved from the index is less than an estimated total number of row identifiers to be retrieved from the index, and predicting an actual number of row identifiers to be retrieved from the index based on the one or more key values accessed and the plurality of row identifiers retrieved.

DETAILED DESCRIPTION

Figure 1:
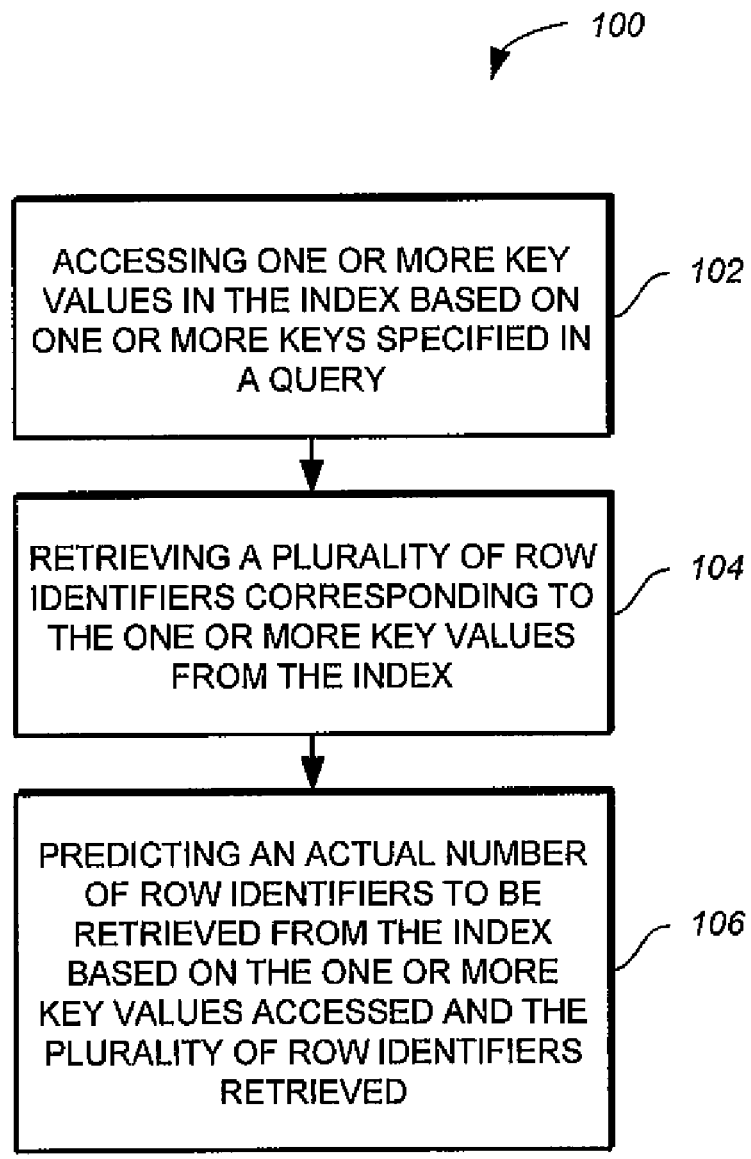
FIG. 1 is a flowchart of a method for managing row identifier list processing on an index according to an aspect of the invention.

The present invention relates generally to database systems and more particularly to management of row identifier (RID) list processing in database systems. The following description is presented to enable one of ordinary skill in the art to make and use the invention and is provided in the context of a patent application and its requirements. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

Data in database systems are typically accessed using commands constructed in a query language, such as structured query language (SQL). Query statements, however, only describe the data to be access, not how the data should be accessed. As a result, database systems must formulate an execution plan for each query to access the requested data.

Row identifier list processing, also referred to as record identifier list processing, is one way to access data stored in a database system. With RID list processing, one or more indexes are accessed to produce a list of identifiers for rows/records that may contain data requested by a query. The list can then be sorted before accessing one or more data pages in which the identified rows are located. RID list processing may be more efficient than performing a tablespace scan (e.g., scanning all data pages) to locate desired data under certain circumstances, such as when the desired data is only a small fraction of the total data. RID list processing may also be more efficient than index access to the data without RID list processing in certain circumstances. Without RID list processing, plurative accesses to the same data pages may require the page to be revisited multiple times.

Statistics are used by database systems to determine when RID list processing is more appropriate than index access without RID list processing, and vice versa. However, if the statistics used by the database system are stale (i.e., out-of-date at execution time), the decision to use RID list processing or not may be incorrect. Some database systems have implemented a set cutoff point such that once a certain percentage of the total number of row identifiers (RIDs) have been retrieved, RID list processing is immediately terminated, the partially finished RID list is discarded, and an alternate execution plan is used (e.g., a tablespace scan). Discarding the partially finished RID list, however, can be wasteful if RID list processing is close to completion (e.g., when there are only a few more RIDs to be retrieved).

A RID list process may also be abruptly terminated when memory allocated for the RID list process is maxed out prior to completion of the RID list process or when the RID list process shares a memory pool with other processes executing in parallel and the memory pool becomes fully utilized while the RID list process is still executing. This leads to poor performance as RID list processing is prematurely terminated and the entire process is restarted with an alternative access plan.

Depicted in FIG. 1 is a process 100 for managing row identifier list processing on an index according to an aspect of the invention. At 102, one or more key values in the index are accessed based on one or more keys specified in a query. A plurality of row identifiers corresponding to the one or more key values are retrieved from the index at 104. In one embodiment, the plurality of row identifiers retrieved from the index is less than an estimated total number of row identifiers to be retrieved from the index. At 106, an actual number of row identifiers to be retrieved from the index is predicted based on the one or more key values accessed and the plurality of row identifiers retrieved.

The actual number of row identifiers to be retrieved is predicted while the index is being accessed because the number predicted at runtime (i.e., execution time) may differ from the number estimated at bind time (i.e., when RID list processing was selected over other execution plans, such as a tablespace scan). In one embodiment, a count of the number of row identifiers retrieved for each key value is maintained and then projected as a total figure based on the percentage of key values or row identifiers currently retrieved in order to predict the actual number of row identifiers to be retrieved.

Prediction of the actual number of row identifiers to be retrieved may be performed multiple times as additional row identifiers are retrieved from the index. This allows the actual number of row identifiers predicted to be retrieved to be continually refined as row identifier retrieval progresses. For example, if the query involves multiple key values, once 5% of the key values are processed, prediction of an actual number of row identifiers to be retrieved can be made. After 10% of the key values are processed, another prediction can be made, which should be more accurate than the earlier prediction. Another prediction can be made after processing, for instance, 20%, 50%, etc. of the key values.

For queries involving a single key with a single key value, an actual number of qualifying row identifiers may be determined from header information in an index if the index is a fully matching index. An index is fully matching if it has a key that is identical to the key specified in a query. For instance, if the query specifies a predicate "WHERE First_Name=John", then a fully matching index is one in which the index has a key solely on the "First_Name" column. If, instead, the index only has a key on columns "First_Name" and "Last_Name", then the index would be a partially matching index.

With a partially matching index, the actual number of row identifiers to be retrieved can be predicted by accessing a percentage of partially matching key values in the index, averaging the number of row identifiers retrieved for each partially matching key value, and then predicting the actual number based on a projected number of partially matching key values in the index.

As an example, given the scenario discussed above, assume the "First_Name" column has a cardinality of 100 and the "Last_Name" column has a cardinality of 1000, then for any single value of the "First_Name" column, there can be up to 1000 values for the "Last_Name" column. However, assume for the example that only 500 values in the "Last_Name" column are projected to have the value "John" in the "First_Name" column. If 10 partially matching key values are accessed (e.g., key value=John Adams, John Baker, etc.) and each partially matching key value corresponded to 3 row identifiers on average, then the predicted actual number of row identifiers to be retrieved from the index for the key value "John" will be 1500.

Figure 2:
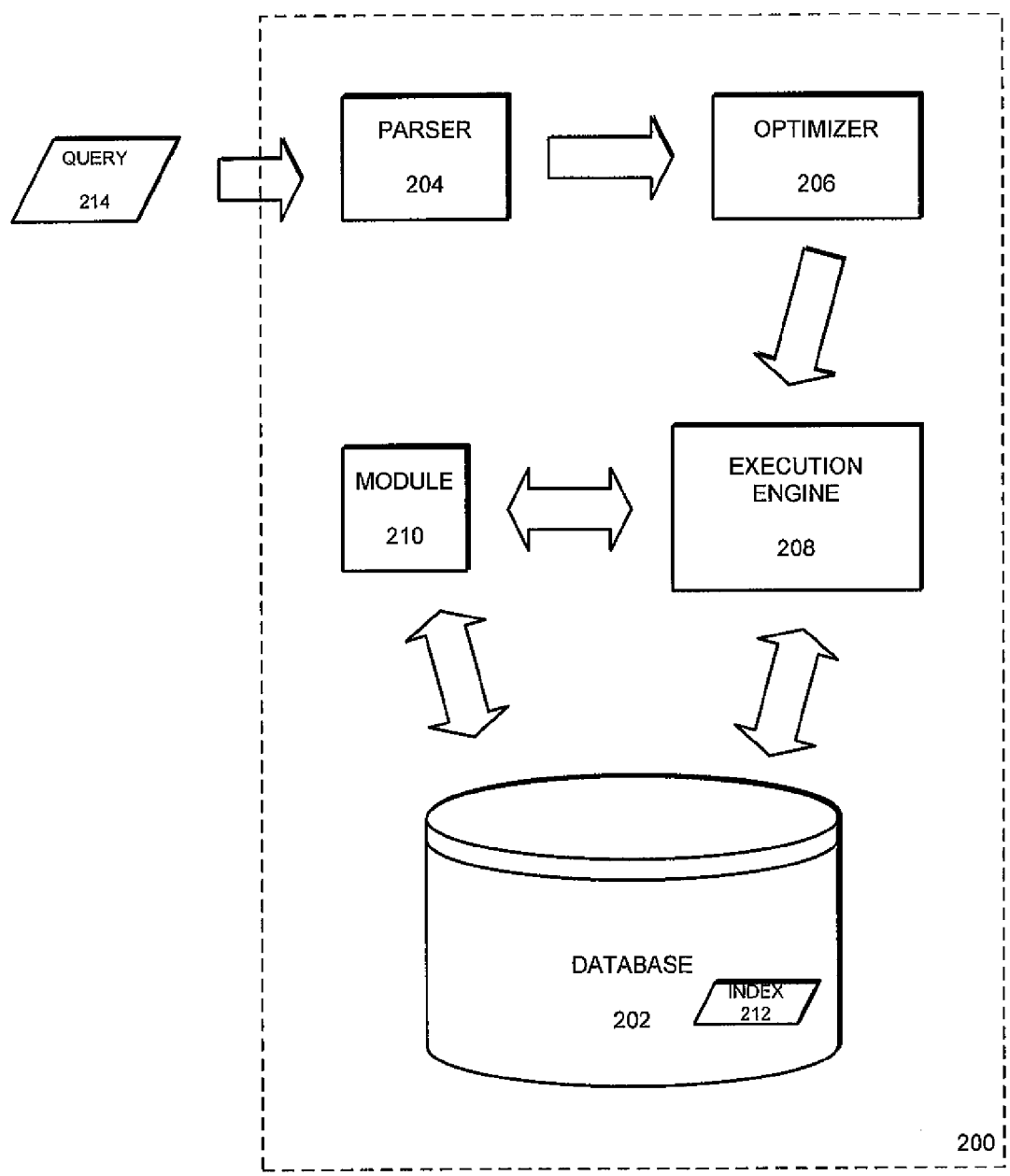
FIG. 2 illustrates a database system in accordance with one implementation of the invention.
Figure 3A:
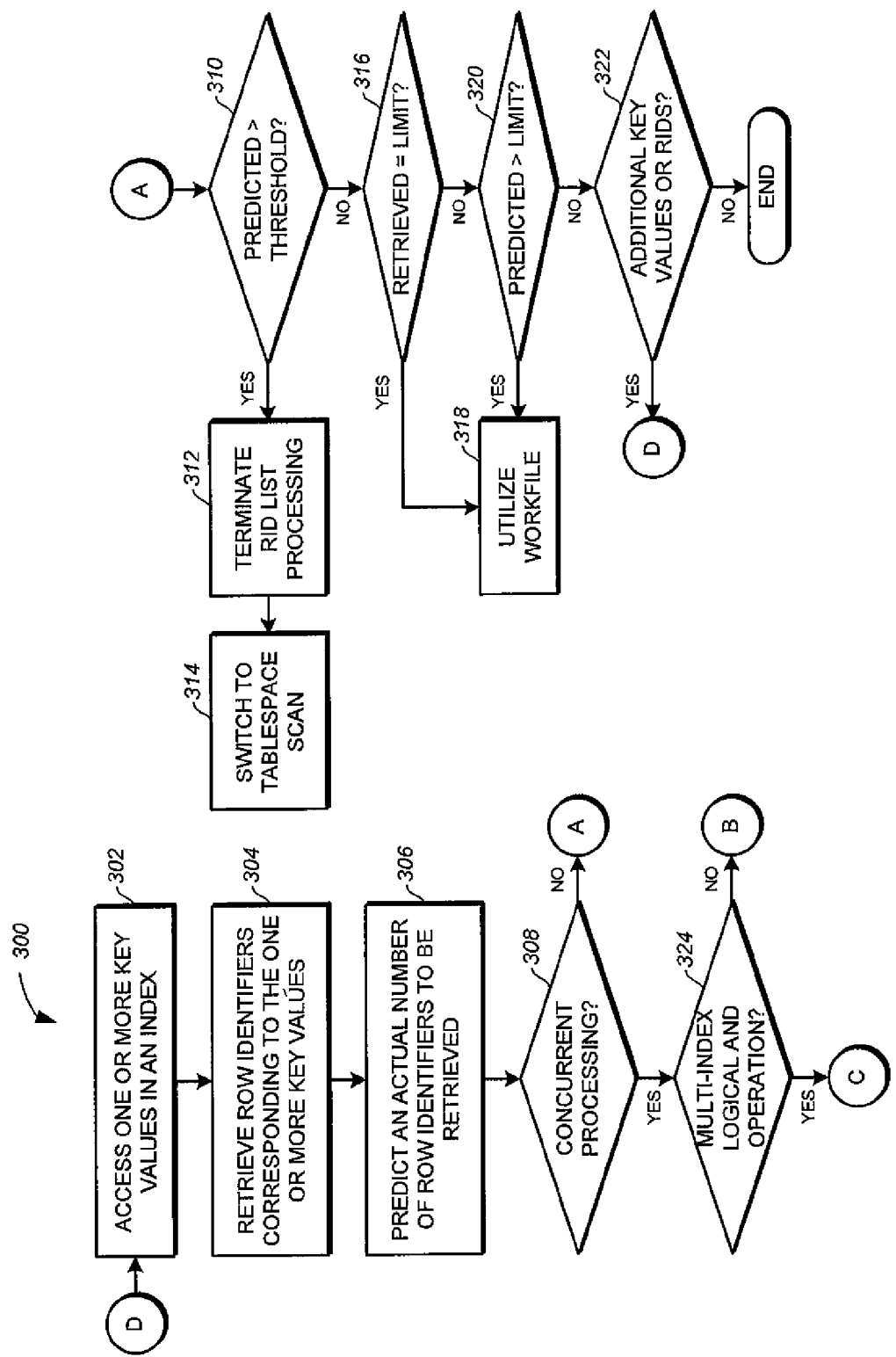
FIGS. 3A-3E depict a process flow of a method for managing row identifier list processing on an index according to an embodiment of the invention.
Figure 3B:
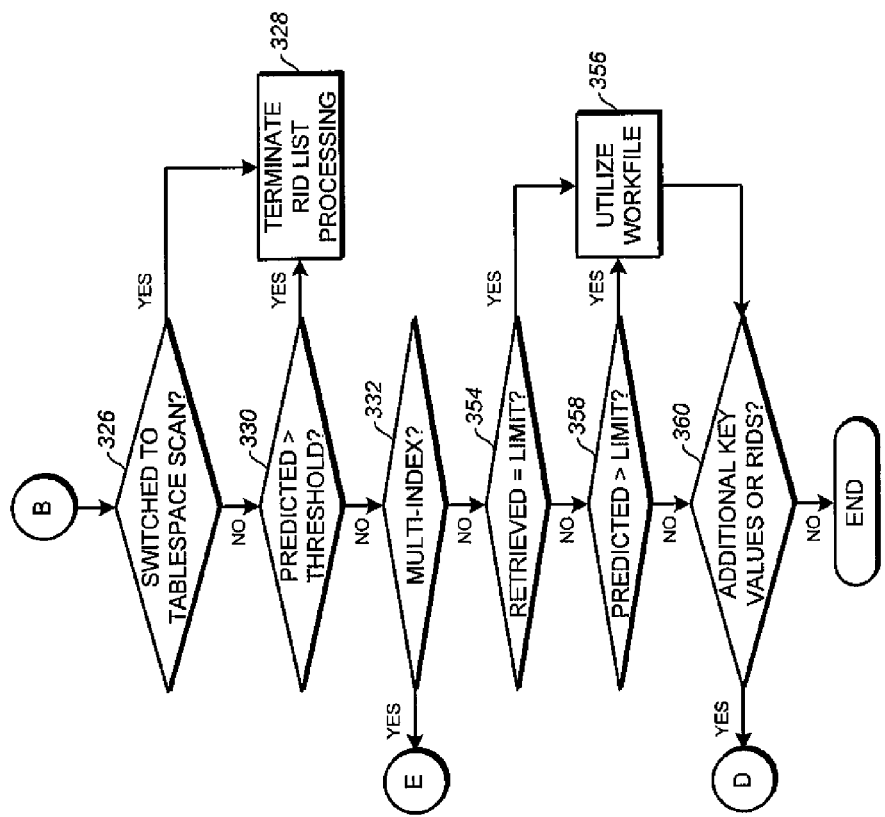
Figure 3C:
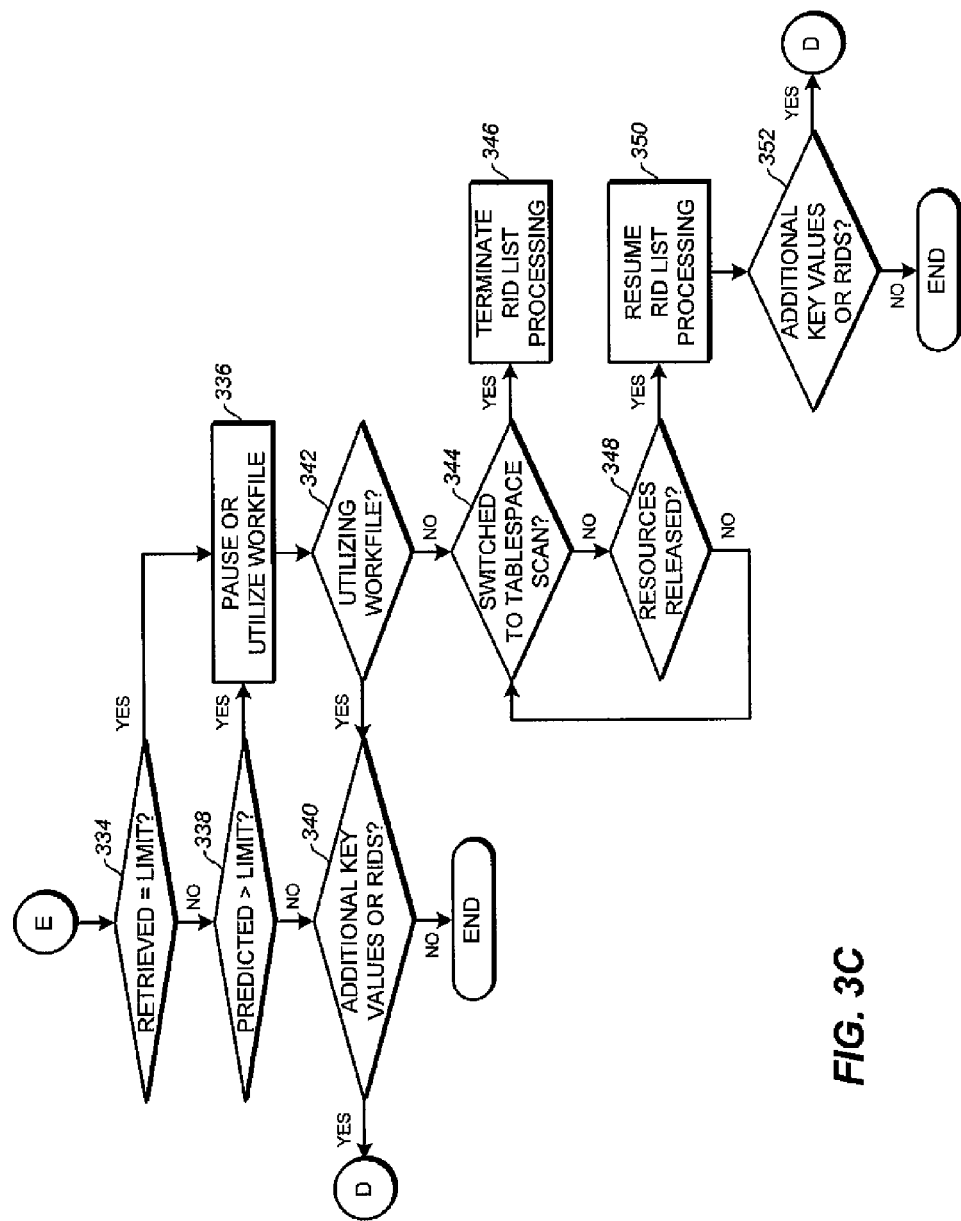
Figure 3D:
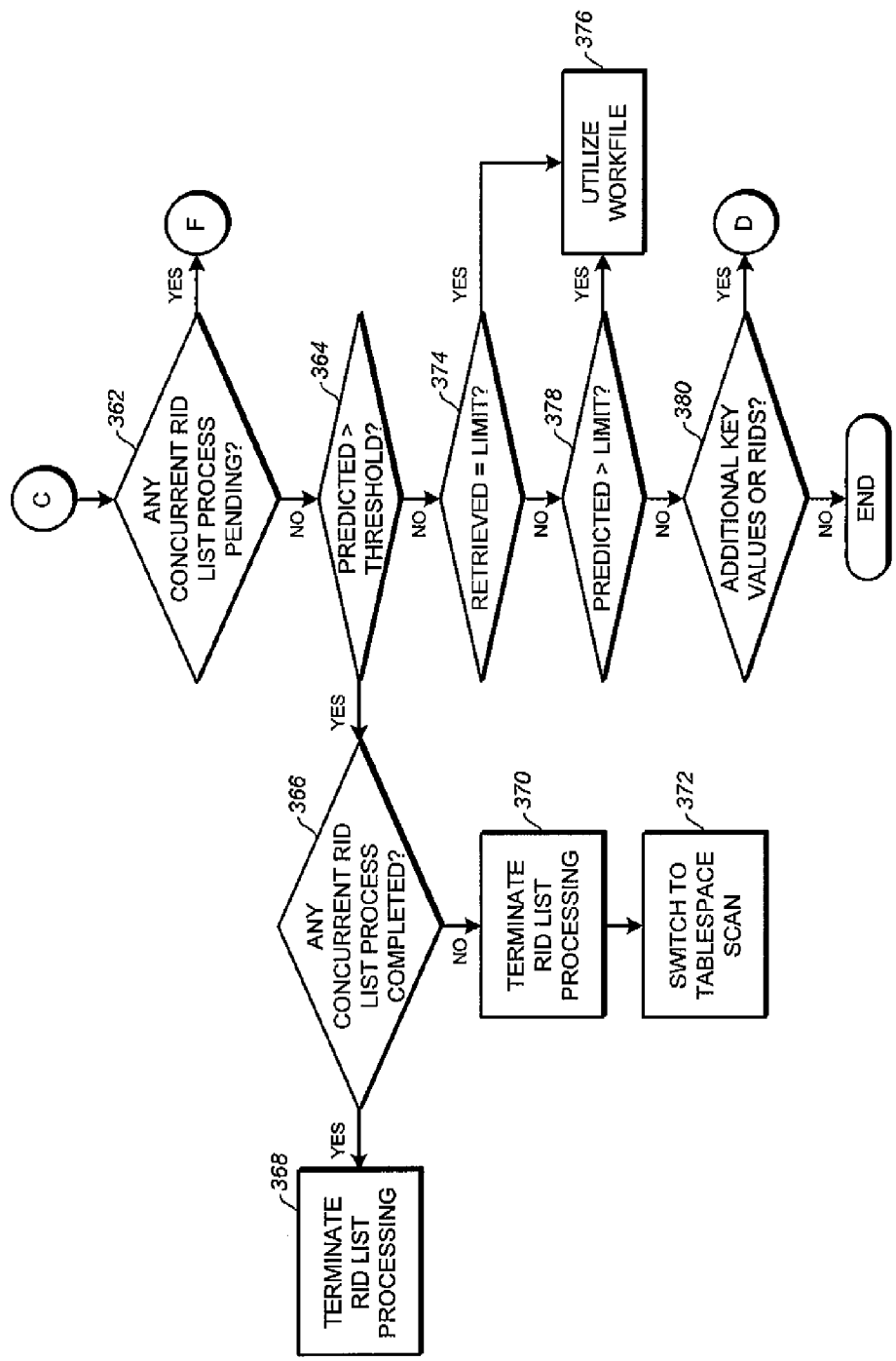
Figure 3E:
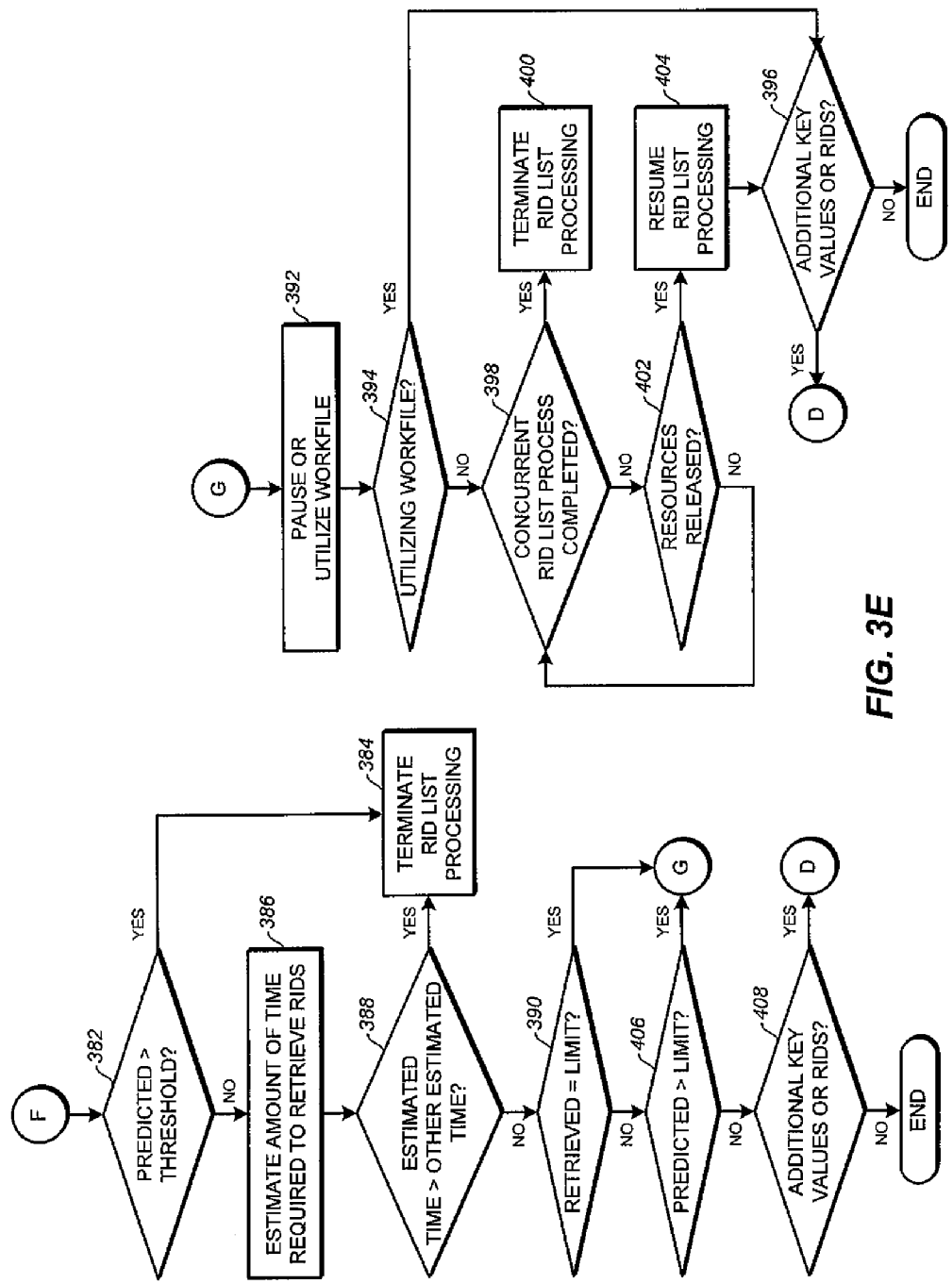

FIG. 2 illustrates a database system 200 in accordance with an implementation of the invention. Database system includes a database 202, a parser 204, an optimizer 206, an execution engine 208, and a module 210. Included in database 202 is an index 212. Database 202 also includes one or more tables stored as one or more data pages (not shown). Other implementations of system 200 may include additional databases and/or other components (not shown). In addition, module 210 may be incorporated into execution engine 208. Further, database 202 may include additional indexes (not shown).

In FIG. 2, a query 214 is submitted to database system 200. Query 214 is parsed by parser 204 and sent to optimizer 206 to formulate one or more execution plans. In the embodiment, the execution plan selected for query 214 involves RID list processing on index 212 in database 202. Based on the execution plan selected for query 214, execution engine 208 accesses one or more key values in index 212 based on one or more keys specified in query 214 and retrieves a plurality of row identifiers corresponding to the one or more key values from index 212. Module 210 is then able to predict an actual number of row identifiers to be retrieved from index 212 based on the one or more key values accessed and the plurality of row identifiers retrieved.

Shown in FIGS. 3A-3E is a process 300 for managing row identifier list processing on an index according to an embodiment of the invention. One or more key values in an index are accessed based on one or more keys specified in a query (302). Row identifiers corresponding to the one or more key values are retrieved from the index (304). An actual number of row identifiers to be retrieved from the index is predicted based on the one or more key values accessed and the row identifiers retrieved (306).

A determination is made at 308 as to whether the RID list process is being concurrently executed with one or more other RID list processes. For instance, if a query specifies a predicate "WHERE Age BETWEEN 30 AND 49", then while one RID list process is assigned to retrieve row identifiers corresponding to key values between 30 and 39, another RID list process can be assigned to concurrently retrieve row identifiers corresponding to key values between 40 and 49. The results of the two RID list processes can then be unioned using a logical OR operation.

Concurrent processing may also be used when multiple indexes need to be accessed. As an example, if a query specifies a predicate "WHERE Dept=Marketing AND Salary>50,000" and there is an index on the "Dept" column and another index on the "Salary" column, then one RID list process can be executing on the "Dept" index while another RID list process is concurrently executing on the "Salary" index. The results of the two RID list process can then be intersected using a logical AND operation. In addition, for multi-index operations, processing on each index can be further broken down into multiple processes similar to single index concurrent processing. The results for each index's sub-processes are then combined using a logical OR operation before being unioned or intersected with the result(s) of other index(es).

If the RID list process is not a part of concurrent (i.e., parallel) processing, a determination is made at 310 as to whether the actual number of row identifiers predicted to be retrieved from the index is above a threshold. The threshold may be, for example, a specific number row identifiers (e.g., 1000 row identifiers) or a percentage of the total number of row identifiers (e.g., 25%). In addition, the threshold may be hard-coded or be user-specified.

When the prediction is above the threshold, RID list processing is terminated at 312 and execution of the query is switched to a tablespace scan at 314. The decision of whether to switch to a tablespace scan is more likely to occur initially as this minimizes the amount of wasted effort of building a RID list only to discard it when reverting to a tablespace scan. Once the decision is made to switch to a tablespace scan, the trending analysis ceases, the incomplete RID list is discarded, the memory allocated for the RID list process is released, and the tablespace scan begins.

A determination is made at 316 as to whether the row identifiers that have already been retrieved have reached a limit when the actual number predicted is not above the threshold. The limit may be the amount of memory allocated for the RID list process or the amount of memory currently available for RID list processing. If the limit has been reached, a workfile is utilized for the RID list process (318). The workfile may be in memory or on a hard disk. In addition, the workfile may be created when it is determined that a workfile will be utilized for RID list processing or at an earlier time, e.g., when RID list processing begins.

To switch to workfile utilization, the partially completed RID list is written to the workfile from memory initially allocated for the RID list process. This may require the RID list process to pause and maintain its position within the index while the switching occurs. The memory initially allocated for the RID list process can then be freed and subsequent retrieved RIDs can be written to the workfile. For sequential processing, further trending analysis can be terminated as reverting to workfile and then reverting to a tablespace scan is a considerable waste of processing.

If the limit has not been reached, a determination is made at 320 as to whether the actual number of row identifiers predicted to be retrieved from the index is above the limit. In other embodiments, the limit used for the determinations at 316 and 320 may be different. When the prediction is above the limit, a workfile is utilized for RID list processing (318). A determination is made at 322 as to whether additional key values need to be access or additional row identifiers need to be retrieved when the prediction is not above the limit. If there are remaining key values or row identifiers, the process returns to 302. If there are no key values or row identifiers remaining, then the process ends.

When it is determined at 308 that the RID list process is being concurrently executed with one or more other RID list processes, a determination is made at 324 as to whether the index is a part of a multi-index logical AND operation. If the index is not a part of a multi-index logical AND operation (e.g., multiple RID list processes are concurrently accessing the index or the index is a part of a multi-index logical OR operation), a determination is made at 326 as to whether any other RID list process that is being executed concurrently has switched to a tablespace scan.

RID list processing is terminated at 328 if any other concurrent RID list process has been switched to a tablespace scan. If no other concurrent RID list process has been switched, a determination is made at 330 as to whether the actual number of row identifiers predicted to be retrieved from the index exceeds the threshold. The RID list process is terminated at 328 if the prediction exceeds the threshold. Otherwise, a determination is made at 332 as to whether the index is part of a multi-index operation.

A determination is made at 334 as to whether the row identifiers that have already been retrieved have reached the limit when the index is part of a multi-index operation. When the limit has been reached, RID list processing is paused or a workfile is utilized (336). RID list processing may be paused to allow other concurrent processes to release memory that can then be used when RID list processing resumes.

If the row identifiers that have already been retrieved have not reached the limit, a determination is made at 338 as to whether the actual number of row identifiers predicted to be retrieved from the index is above the limit. When the prediction is above the limit, the process also proceeds to 336 where RID list processing is paused or a workfile is utilized for RID list processing. A determination is made as to whether there are additional key values or row identifiers that need to be accessed or retrieved (340) when the prediction is not above the limit. If other key values or row identifiers need to be accessed or retrieved, the process returns to 302. If no key values or row identifiers remain, the process ends.

At 342, a determination is made as to whether a workfile is being utilized for RID list processing. If yes, then the process returns to 340 to determine whether there are additional key values or row identifiers to be accessed or retrieved. However, if it is determined at 342 that a workfile is not being utilized for RID list processing, i.e., RID list processing has been paused, a determination is made at 344 as to whether any concurrent RID list process has been terminated and switched to tablespace scan.

When a concurrent RID list process has switched to a tablespace scan, RID list processing is terminated at 346. A determination is made at 348 as to whether resources have been released (e.g., memory resources released by a concurrent RID list process that has concluded) when no concurrent RID list process has switched. If additional resources have not become available, the process returns to 344. If resources have been released, RID list processing is resumed at 350 and a determination is made at 352 as to whether there are additional key values or row identifiers that need to be accessed or retrieved. The process returns to 302 if there are additional key values or row identifiers that have not been accessed or retrieved. When all of the key values and row identifiers have been accessed and retrieved, then the process ends.

If it is determined at 332 that the index is not part of a multi-index operation, a determination is made at 354 as to whether the row identifiers already retrieved have reached the limit. When the limit has been reached, a workfile is utilized for RID list processing at 356. Otherwise, a determination is made at 358 as to whether the actual number of row identifiers predicted to be retrieved from the index exceeds the limit. A workfile will be utilized for RID list processing (356) when the prediction exceeds the limit. If the limit is not exceeded, a determination is made as to whether additional key values or row identifiers need to be accessed or retrieved (360). The process ends if no additional key values or row identifiers remain. However, the process returns to 302 when there are additional key values or row identifiers to be accessed or retrieved.

Process 300 proceeds to 362 to determine whether at least one other concurrent RID list process is still pending if it is determined at 324 that the index is part of a multi-index logical AND operation. When no other concurrent RID list process is still pending, a determination is made at 364 as to whether the actual number of row identifiers predicted to be retrieved from the index exceeds the threshold. If the threshold is exceeded, a further determination is made at 366 as to whether at least one other concurrent RID list process completed processing (i.e., was not terminated prior to completion). RID list processing is terminated at 368 when at least one other concurrent RID list process completed processing. However, if all other concurrent RID list processes terminated prior to completion, RID list processing is terminated at 370 and execution of the query is switched to a tablespace scan at 372.

When it is determined at 364 that the prediction is at or below the threshold, a determination is made at 374 as to whether the retrieved row identifiers have reached the limit. If yes, a workfile is utilized for RID list processing (376). If not, a determination is made at 378 as to whether the actual number of row identifiers predicted to be retrieved from the index exceeds the limit.

When the prediction does exceed the limit, the process returns to 376 to utilize a workfile for RID list processing. The process proceeds to 380 to determine whether additional key values or row identifiers need to be accessed or retrieved when the prediction does not exceed the limit. If there are additional key values or rows, the process returns to 302. Otherwise, the process ends.

If it is determined at 362 that at least one other concurrent RID list process is still pending, a determination is made at 382 as to whether the actual number of row identifiers to be retrieved is above the threshold. RID list processing is terminated at 384 when the prediction is above the threshold. When the prediction is at or below the threshold, an amount of time required to retrieve the actual number of row identifiers predicted to be retrieved from the index is estimated (386).

At 388, a determination is made as to whether the amount of time estimated for retrieval of row identifiers from the index is greater than an amount of time estimated for retrieval of row identifiers from another index being processed by a concurrent RID list process. If the estimated time is greater than the most efficient process by a predetermined amount (e.g., a percentage difference or an amount of time), then the RID list process is terminated (384). If the estimate is not greater, a determination is made as to whether the row identifiers already retrieved have reached the limit (390). The predetermined amount, as with the threshold and the limit, may be user-specified or hard-coded.

The RID list process is paused or a workfile is utilized for RID list processing (392) when the limit is reached. A determination is made at 394 as to whether a workfile is being utilized for RID list processing. If a workfile is being utilized, a determination is made at 396 as to whether additional key values or row identifiers in the index need to be accessed or retrieved. When additional key values or row identifiers remain, the process returns to 302. When no there are no key values or row identifiers remaining, the process ends.

If the RID list process has been paused instead of falling back to a workfile, a determination is made as to whether any concurrent RID list process has completed processing (398). RID list processing is terminated at 400 if at least one other concurrent RID list process has completed processing. When none of the other concurrent RID list process(es) have finished processing, a determination is made at 402 as to whether any shared resources have been released. If no resources have been released, the process returns to 398. Otherwise, RID list processing resumes at 404.

When it is determined at 390 that the row identifiers already retrieved have not reached the limit, a determination is made at 406 as to whether the actual number of row identifiers predicted to be retrieved from the index is above the limit. If the prediction is above the limit, the process proceeds to 392. On the other hand, if the prediction is at or below the limit, a determination is made as to whether additional key values or row identifiers need to be accessed or retrieved (408). RID list processing terminates if no other key values or row identifiers need to be accessed or retrieved. However, if addition key values or row identifiers remain, the process returns to 302.

With parallel processing, the determination of when to pause, terminate, or utilize a workfile can be made by a parent process or task that controls and monitors multiple child processes or tasks that are executing concurrently. The parent process may have knowledge about available memory. In addition, the parent task can be assigned to perform the trending analysis for each child task, i.e., predicting the actual number of row identifiers to be retrieved by each child task.

In one implementation, each child process communicates with the parent process by periodically posting intermediate results of its runtime progress. Before each posting, the child checks the action recommended by the parent, which is based on trending analysis of a previous posting by the child. The frequency of child postings is an implementation decision that balances overhead associated with child postings and the parent's ability to effectively keep up with the number of concurrent child processes. Additionally, the frequency may be user-defined or hard-coded. Further, the frequency and schedule of postings by different child processes may vary.

As an example, assume there are two concurrent child tasks, T1 and T2, that are processing separate indexes and whose RID lists will be intersected (i.e., logically AND'ed together). Tasks T1 and T2 are overseen by a parent task P. Before one of the child tasks makes a first posting, it will check the first decision from the parent, which should be "continue" unless other factors, such as unavailable memory or completion of the other child task dictates another action. Assuming the action requested is "continue", each child task will post its first intermediate results and continue processing. Since a child task does not have to wait for the next decision, idle time is minimized. The child task, however, will wait if it has reached a physical limit, such as lack of memory for processing.

The parent task continually receives intermediate postings from each child task and performs trending analysis on the posted data and determines the next action for each child task. If the parent is unable to keep up with postings by a child task, the child will overwrite the previous post and therefore, the parent will only have the latest posted information. Child tasks will assume that the action determined by the parent task is the most current.

When the requested action is "continue", no special action is required by the child. When the requested action is "fallback to tablespace scan", the child will cease RID list processing, discard its RID list, and begin a tablespace scan. In addition, the parent will cease monitoring. When the requested action is "fallback to workfile", the child will fallback to workfile processing, however, monitoring by the parent will continue as it is possible that a future request will be to terminate the child if, for example, other child tasks prove to be more efficient. When the requested action is "pause", the child task performs no action and waits for its next posting period to find out the next action. This action may be requested to allow other tasks to free up memory. When the requested action is "terminate", the child terminates and releases its allocated memory. This may be requested because another child has reverted to a tablespace scan or the child has proven to be inefficient. Only when the requested action is "continue", "pause", or "fallback to workfile" will a child task continue to post results.

Runtime monitoring and prediction of the actual number of row identifiers to be retrieved will permit early warning of the potential for RID list processing failure and excessive use of shared resources, and provide the capability to proactively avoid and reactively recover from failures and inefficiencies that can occur with RID list processing. This ensures that one process does not consume a majority of memory to the detriment of other processes. In addition, recovery from an incorrect decision to perform RID list processing occurs earlier. Further, with parallel processing, performance is improved through termination of inefficient tasks.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 4:
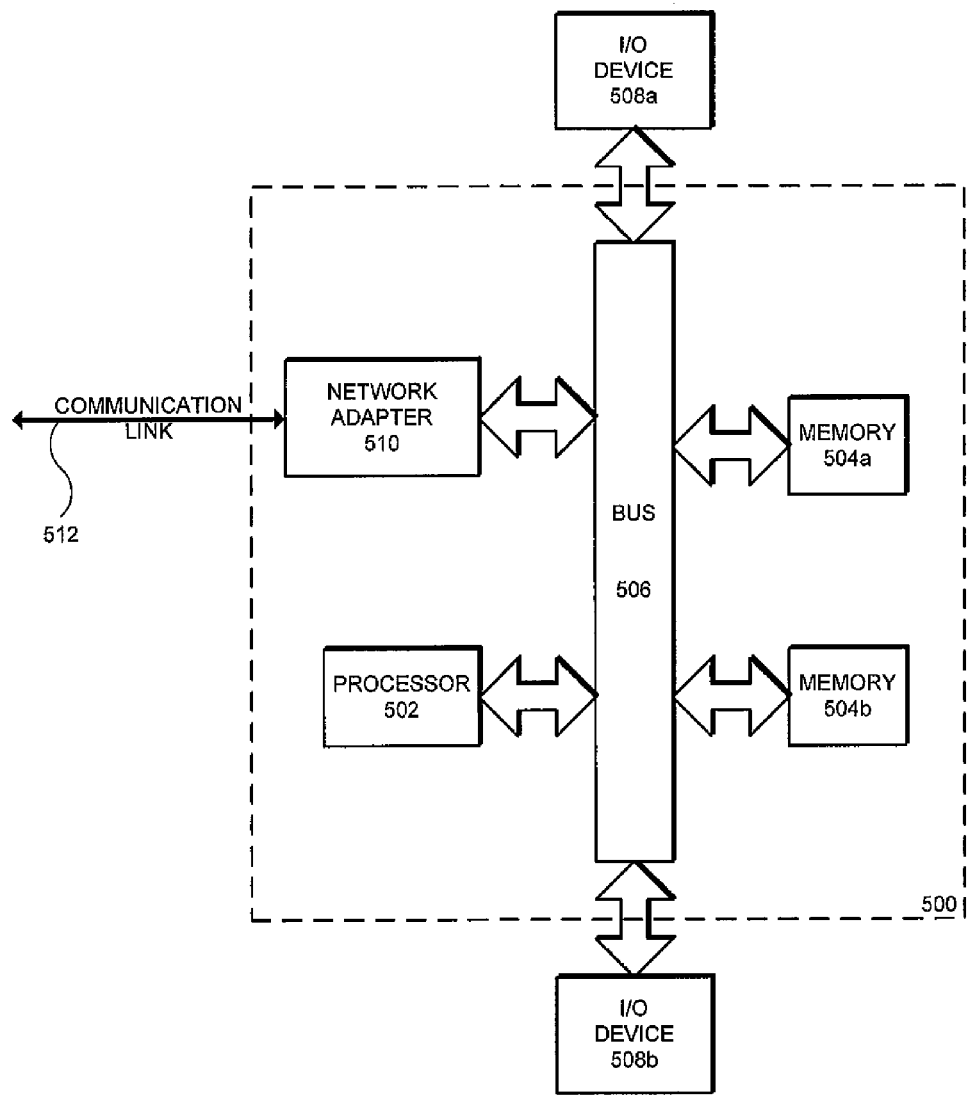
FIG. 4 shows a block diagram of a data processing system with which embodiments of the present invention can be implemented.

FIG. 4 depicts a data processing system 500 suitable for storing and/or executing program code. Data processing system 500 includes a processor 502 coupled to memory elements 504a-b through a system bus 506. In other embodiments, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the embodiment, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Various implementations for management of RID list processing have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A method for managing row identifier (RID) list processing on an index using an electronic computing device, the method comprising:

causing the electronic computing device to select RID list processing at a binding time to process a query;

causing the electronic computing to receive the query;

causing the electronic computing device to access one or more key values in the index based on one or more keys specified in the query;

causing the electronic computing device to retrieve a plurality of row identifiers corresponding to the one or more key values the index at a runtime, wherein the plurality of row identifiers retrieved index is less than an estimated total number of row identifiers to be retrieved from the index, and wherein the estimated total number of row identifiers is determined at the binding time;

causing the electronic computing device make a prediction of an actual number of row identifiers to be retrieved the index based on the one or more key values accessed and the plurality of row identifiers retrieved, wherein the prediction is made at the runtime; and causing the electronic computing device to determine whether to continue processing the query by RID list processing based on the prediction, wherein the prediction is multiply made during the runtime.

2. The method of claim 1, further comprising:

terminating the RID list processing on the index during the runtime in response to the actual number of row identifiers predicted to be retrieved from the index being above a threshold or in response to termination of RID list processing on another index when the index and the other index are part of a multi-index logical OR operation.

3. The method of claim 2, further comprising:

switching execution of the query to a tablespace scan after termination of the RID list processing on the index during the runtime when the index is not a part of a multi-index operation or when the index is a part of a multi-index logical OR operation.

4. The method of claim 1, further comprising:

estimating an amount of time required to retrieve the actual number of row identifiers predicted to be retrieved from the index; and terminating the RID list processing on the index in response to the amount of time estimated for retrieval of row identifiers from the index being greater than an amount of time estimated for retrieval of row identifiers from another index by a predetermined amount when the index and the other index are part of a multi-index logical AND operation.

5. The method of claim 1, further comprising:

pausing the RID list processing on the index in response to the plurality of row identifiers retrieved from the index reaching a limit, wherein the limit is an amount of memory allocated for the RID list processing on the index.

6. The method of claim further comprising:
utilizing a work file for the RID list processing on the index in response to the actual number of row identifiers predicted to be retrieved from the index being above a limit or in response to the plurality of row identifiers retrieved from the index reaching the limit, wherein the limit is an amount of memory allocated for the RID list processing on the index.

7. The method of claim 1, wherein prediction of the actual number of row identifiers is performed again in response to retrieval of additional row identifiers from the index.

8. A computer device program product for managing row identifier (RID) list processing on an index using a computing device, the computing device program product comprising:
a computer readable medium;
first programmatic instructions for selecting RID list processing at a binding time to process a query;
second programmatic instructions for receiving the query;
third programmatic instructions for accessing one or more key values in the index based on one or more keys specified in the query;
fourth programmatic instructions for retrieving a plurality of row identifiers corresponding to the one or more key values from the index at a runtime, wherein
the plurality of row identifiers retrieved from the index is less than an estimated total number of row identifiers to be retrieved from the index and wherein
the estimated total number of row identifiers is determined at the binding time:
fifth programmatic instructions for predicting an actual number of row identifiers to be retrieved from the index based on the one or more key values accessed and the plurality of row identifiers retrieved wherein the predicting is made at a runtime; and
sixth programmatic instructions for determining whether to continue processing the query by RID list processing based on the prediction, wherein the prediction is multiply made during the runtime.

9. The computer device program product of claim 8, further comprising:
seventh programmatic instructions for terminating the RID list processing on the index during the runtime in response to the actual number of row identifiers predicted to be retrieved from the index being above a threshold or in response to termination of RID list processing on another index when the index and the other index are part of a multi-index logical OR operation; and
eighth programmatic instructions for switching execution of the query to a tablespace scan after termination of the RID list processing on the index during the runtime when the index is not a part of a multi-index operation or when the index is a part of a multi-index logical OR operation.

10. The computer device program product of claim 8, further comprising:
ninth programmatic instructions for estimating an amount of time required to retrieve the actual number of row identifiers predicted to be retrieved from the index; and
tenth programmatic instructions for terminating the RID list processing on the index in response to the amount of time estimated for retrieval of row identifiers from the index being greater than an amount of time estimated for retrieval of row identifiers from another index by a predetermined amount when the index and the other index are part of a multi-index logical AND operation.

11. The computer device program product of claim 8, further comprising:
eleventh programmatic instructions for pausing the RID list processing on the index in response to the plurality of row identifiers retrieved from the index reaching a limit, wherein the limit is an amount of memory allocated for the RID list processing on the index.

12. The computer device program product of claim 8, further comprising:
twelfth programmatic instructions for utilizing a workfile for the RID list processing on the index in response to the actual number of row identifiers predicted to be retrieved from the index being above a limit or in response to the plurality of row identifiers retrieved from the index reaching a limit, wherein the limit is an amount of memory allocated for the RID list processing on the index.

13. The computer device program product of claim 8, wherein prediction of the actual number of row identifiers is performed again in response to retrieval of additional row identifiers from the index.

14. A system for managing row identifier (RID) list processing on an index, the system comprising:
an electronic computing device for processing the index:
a database comprising an index, the index including a plurality of key values, wherein each key value is associated with a plurality of row identifiers:
an optimizer in communication with the database, the optimizer being operable to estimate a total number of row identifiers to be retrieved from the index for a query; and
an execution engine in communication with the database and the optimizer, the execution engine being operable to:
select RID list processing at a binding time to process a query;
receive the query;
access one or more key values in the index based on one or more keys specified in the query,
retrieve a plurality of row identifiers corresponding to the one or more key values the index specified by the query, wherein the plurality of row identifiers retrieved from the index is less than the estimated total number of row identifiers to be retrieved from the index and wherein the estimated total number of row identifiers is determined at the binding time,
predict an actual number of row identifiers to be retrieved from the index based on the one or more key values accessed and the plurality of row identifiers retrieved wherein the prediction is made at he runtime, and
determine whether to continue processing the query by RID list processing based on the prediction, wherein the prediction is multiply made during the runtime.

15. The system of claim 14, wherein the execution engine is further operable to:
terminate the RID list processing on the index during the runtime in response to the actual number of row identifiers predicted to be retrieved from the index being above a threshold or in response to termination of RID list processing on another index when the index and the other index are part of a multi-index logical OR operation.

16. The system of claim 15, wherein the execution engine is further operable to:
switch execution of the query to a tablespace scan after termination of the RID list processing on the index during the runtime when the index is not a part of a multi-index operation or when the index is a part of a multi-index logical OR operation.

17. The system of claim 14, wherein the execution engine is further operable to:
estimate an amount of time required to retrieve the actual number of row identifiers predicted to be retrieved from the index, and
terminate the RID list processing on the index in response to the amount of time estimated for retrieval of row identifiers from the index being greater than an amount of time estimated for retrieval of row identifiers from another index by a predetermined amount when the index and the other index are part of a multi-index logical AND operation.

18. The system of claim 14, wherein the execution engine is further operable to:
pause the RID list processing on the index in response to the plurality of row identifiers retrieved from the index reaching a limit, wherein the limit is an amount of memory allocated for the RID list processing on the index, 19. The system of claim 14, wherein the execution engine is further operable to:
utilize a workfile for the RID list processing on the index in response to the actual number of row identifiers predicted to be retrieved from the index being above a limit or in response to the plurality of row identifiers retrieved from the index reaching a limit, wherein the limit is an amount of memory allocated for the RID list processing on the index.

20. The system of claim 14, wherein the execution engine is further operable to perform prediction of the actual number of row identifiers again in response to retrieval of additional row identifiers from the index by the execution engine.

* * * * *